United States Patent [19]

Goodman

[11] Patent Number: 5,072,781

[45] Date of Patent: Dec. 17, 1991

[54] TEMPERATURE CONTROL SYSTEM

[75] Inventor: Robert B. Goodman, West Hartford, Conn.

[73] Assignee: United Technologies Corporation, Hartford, Conn.

[21] Appl. No.: 559,027

[22] Filed: Jul. 30, 1990

[51] Int. Cl.⁵ .............................................. B60H 1/02
[52] U.S. Cl. ...................................... 165/40; 236/80 E
[58] Field of Search ........................... 236/12.11, 80 E; 165/40; 137/88

[56] References Cited

U.S. PATENT DOCUMENTS

| | | | |
|---|---|---|---|
| 1,508,938 | 9/1924 | Powers et al. | 137/88 |
| 2,152,028 | 3/1939 | Church | 137/88 X |
| 2,424,891 | 7/1947 | Kirchhoff | 236/12.11 |
| 2,449,766 | 9/1948 | Brown | 236/12.11 |
| 3,352,489 | 11/1967 | Coulombe et al. | 236/12.11 |
| 3,561,483 | 2/1971 | Taplin | 236/12.11 X |
| 4,318,509 | 3/1982 | Patrick et al. | 236/87 |

Primary Examiner—William E. Tapolcai
Attorney, Agent, or Firm—Malcom J. Chisholm, Jr.; William W. Habelt

[57] ABSTRACT

An improved temperature control system is disclosed that provides an aircraft working or supply fluid within a desired temperature range for anti-icing, air conditioning and other aircraft subsystems. The supply fluid is bled from compressor stages of a gas turbine engine and passes through a precooler in a heat exchange relationship with a cooling fluid, bled from a fan stage of the engine. A single temperature sensor includes a pair of control poppet or variable orifice ball valves that are adjustably actuated in response to temperature changes of the supply fluid downstream of the precooler. The control poppet valves pneumatically regulate flow of the supply fluid and cooling fluid upstream of the precooler, to keep the supply fluid within the desired temperature range.

15 Claims, 1 Drawing Sheet

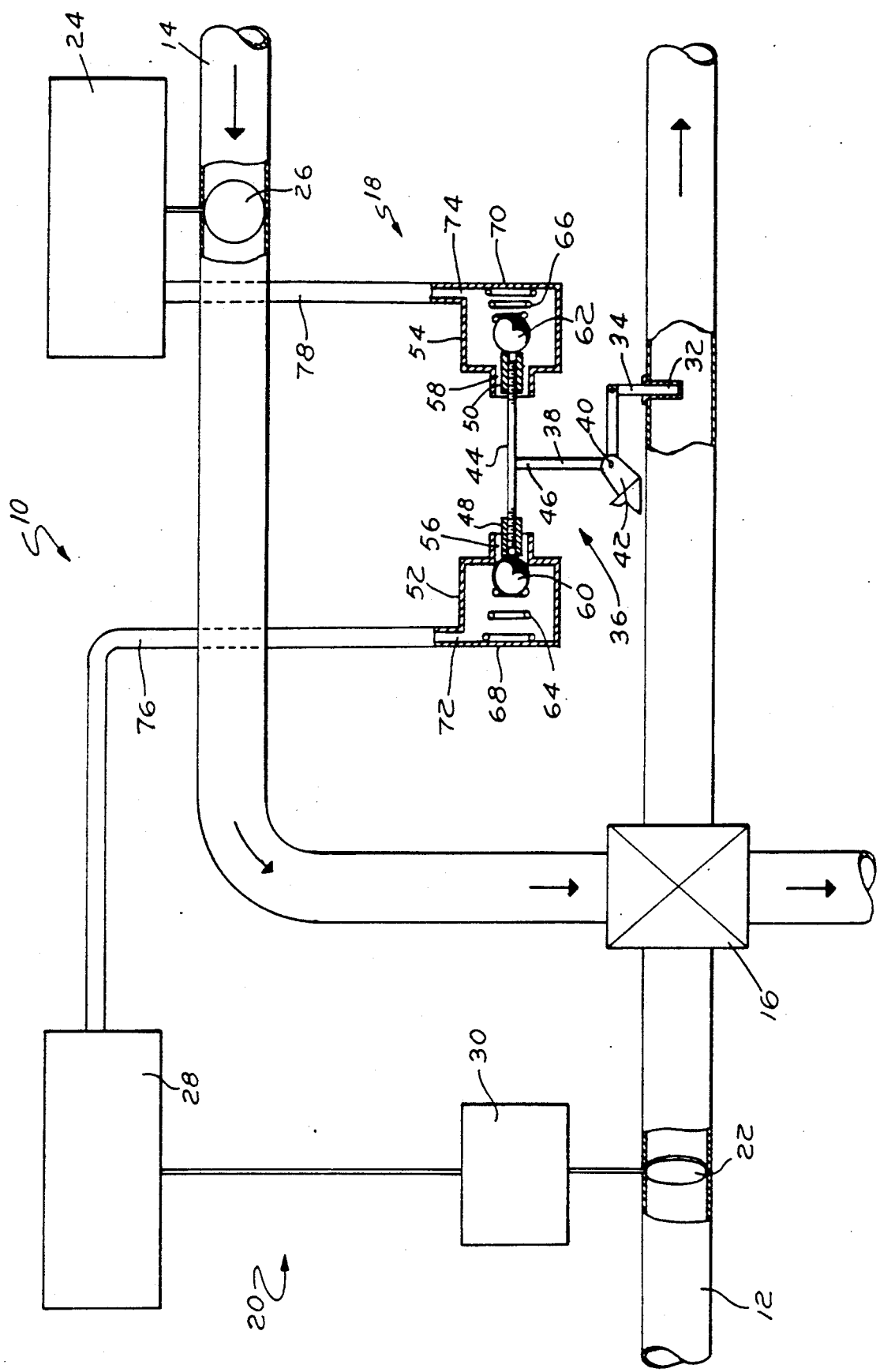

TEMPERATURE CONTROL SYSTEM

BACKGROUND OF THE INVENTION

The present invention relates to a temperature control system for providing an operating or supply fluid having a temperature within a desired temperature range. In particular, a temperature control system is disclosed for use in supplying compressor bleed air from a gas turbine engine within a specific temperature range by controlling the heat exchange disposition of two fluids of differing temperatures.

It is well known on modern aircraft powered by gas turbine engines to utilize air bled from compressor stages of the engine for anti-icing, cabin air conditioning and powering of various aircraft subsystems. The temperature of the compressor bleed air must be maintained within a temperature range, typically between approximately 280° F. and 450° F. A variety of temperature control systems are known for providing compressor bleed air within such a range.

One such system is disclosed in U.S. Pat. No. 4,318,509 to Patrick et al., assigned to the assignee of the present invention. The "Patrick" system provides a supply fluid at a select temperature by warming or cooling the supply fluid with a controlled flow of a cooling fluid. Control of the cooling fluid flow is achieved by a modulation valve which is adjustable in response to the pressure of a servo fluid, which is in turn adjusted in response to a first temperature-sensor that measures temperature of the supply fluid downstream of the cooling by the cooling fluid.

In Patrick, modulation of the flow of the cooling fluid to change the temperature of the supply fluid in response to temperature changes of the supply fluid effectively describes a single feedback loop control circuit. Further developments have provided for addition of a second feedback loop. It controls flow of the supply fluid in response to a second sensor-measured temperature of the supply fluid. In the second feedback loop, pressure of a second servo fluid effects a pressure regulating valve that controls flow of the supply fluid upstream of the cooling of the supply fluid by the cooling fluid.

The double feedback loop is especially appropriate for maintaining the supply fluid within a specific temperature range. Typically the supply fluid must not descend below a minimum temperature for the anti-ice system and it must not exceed a maximum temperature for the cabin air conditioning and other aircraft systems.

In a double feedback loop system, separate temperature sensors are used for maintaining the minimum and maximum temperature functions, e.g., to control each loop. The temperature sensors are exposed to a hostile environment adjacent a gas turbine engine and are subject to damage and deterioration from heat and/or vibration. Consequently, the sensors must be very durable to perform with the high degree of reliability necessary to properly sustain the aforesaid aircraft functions. Therefore, the number of temperature sensors is a significant cost factor, and the number of required moving parts is a significant reliability factor associated with known compressor bleed air temperature control systems.

Accordingly, it is the general object of the present invention to provide an improved temperature control system that overcomes the reliability and cost problems of the prior art.

It a more specific object to provide a temperature control system which is more reliable to operate by employing fewer moving parts than known systems.

It is another specific object to provide a temperature control system which replaces dual temperature sensors by a single temperature sensor for providing minimum and maximum temperature control.

It is yet another object to provide a temperature control system which is more economical to produce than known systems, yet extremely safe and durable to use.

The above and other objects and advantages of this invention will become more readily apparent when the following description is read in conjunction with the accompanying drawings.

SUMMARY OF THE INVENTION

An improved temperature control system is disclosed for controlling the temperature of an operating or supply fluid bled from compressor stages of a gas turbine aircraft engine. The supply fluid must be maintained within a specific temperature range and is used to operate anti-ice systems, cabin air conditioning and other aircraft subsystems.

In the preferred embodiment, the invention comprises a pressure and flow regulated supply fluid; a temperature sensor that senses the temperature of the supply fluid; a flow modulated cooling fluid; and a heat-transfer precooler that is positioned to afford a heat transfer relationship between the supply and cooling fluids.

The temperature sensor includes a bimetallic element within a supply duct that is in contact with the supply fluid passing through the duct, which element moves an attached stem in response to temperature changes of the supply fluid; an actuator assembly affixed to the stem; and two opposed variable orifice ball valves or control poppets in dynamic association with the actuator assembly. One of the control poppets, a pressure regulating valve control poppet, is in fluid communication with, and adjustably actuates, a pressure regulating valve that operates a supply fluid flow regulating valve in the supply duct containing the supply fluid. The other control poppet, a precooler control poppet, is in fluid communication with, and adjustably actuates, a pneumatic modulator that operates a cooling fluid flow regulating valve in a cooling duct containing the cooling fluid.

The supply fluid is bled, via supply duct work, from various compressor stages of the gas turbine engine, and flows past the supply fluid flow regulating valve; through the heat-transfer precooler; and past the bimetallic element of the temperature sensor. The cooling fluid is directed, via cooling duct work, from an unheated point in the engine, such as a fan stage; past a cooling fluid flow regulating valve; and through the heat-transfer precooler.

Prior to use, the actuator assembly is adjusted in a temperature bath so that it activates the control poppets in response to specific temperatures. In use, as the temperature of the first fluid approaches a specific upper limit, temperature responsive movement of the bimetallic element causes the actuator assembly to adjust the pressure regulating valve control poppet so that it causes the pressure regulating valve to activate the supply fluid flow regulating valve thereby decreasing the flow rate of the supply fluid through the precooler.

At that temperature, the actuator assembly allows the precooler control poppet to enable the modulator to keep the cooling fluid regulating valve from restricting flow of the cooling fluid. As the temperature of the fluid approaches a specific lower limit, responsive movement of the bimetallic element causes the actuator assembly to reverse the aforesaid positions of the two control poppets, thereby increasing the flow rate of the supply fluid through the heat exchange precooler and decreasing the rate of flow of the cooling fluid through the precooler.

Therefore, one temperature sensor controls two feedback loops, one regulating flow of the supply fluid, and the other regulating flow of the cooling fluid, thereby keeping the temperature of the supply fluid within specific, pre-set, upper and lower temperature limits.

BRIEF DESCRIPTION OF THE DRAWING

FIG. 1 is a schematic representation of the temperature control system of the present invention.

DETAILED DESCRIPTION OF THE PREFERRED EMBODIMENTS

Referring to the drawing in detail, the preferred embodiment of a temperature control system of the present invention is shown and generally designated by the numeral 10. The system basically comprises a supply duct 12 that directs a flow of supply fluid, bled from compressor stages of a gas turbine aircraft engine (not shown); a cooling duct 14 that directs flow of a cooling fluid; a heat-transfer precooler 16 through which the supply and cooling fluids pass in a heat exchange relationship; a temperature sensor 18 that senses temperature changes in the supply fluid downstream from the precooler 16; a pressure regulating valve 20 in fluid communication with both the temperature sensor 18 and a supply fluid flow regulating valve 22 upstream of the precooler 16; and a pneumatic modulator 24 in fluid communication with both the temperature sensor 18 and a cooling fluid flow regulating valve 26 upstream from the precooler 16.

The flow rate and pressure of the supply fluid flowing in supply duct 12 is controlled by pressure regulating valve 20. The valve 20 includes a pneumatic controller 28 that activates a pressure regulating valve actuator 30. The actuator 30 changes the position of the supply fluid flow regulating valve 22 to regulate flow and pressure of the supply fluid. The pneumatic controller 28, actuator 30 and regulating valve 22 are known in the art, such as the pressure regulating valve disclosed in U.S. Pat. No. 4,735,056 to Goodman, the present inventor, assigned to the assignee of the present invention. U.S. Pat. No. 4,735,056 is therefore incorporated herein by reference. Any suitable controller and actuator may, however, be used in the system of the present invention. Similarly, the flow regulating valve 22 may comprise any suitable flow control valve known in the art, such as a butterfly valve.

The supply fluid flows from the regulating valve 22 downstream to the heat-exchange precooler 16. The precooler is also known in the art, such as the precooler disclosed in U.S. Pat. No. 4,318,509, assigned to the assignee of the present invention, and incorporated herein by reference. In the precooler 16, the supply fluid is placed in a heat exchange relationship with the cooling fluid.

The cooling fluid may comprise fan or ram air that flows to the precooler 16 in cooling duct 14. The flow rate of the cooling fluid through duct 14, upstream of the precooler 16, is controlled by valve 26, which is in turn activated by the pneumatic modulator 24. The structures of valve 26 and modulator 24 are well known in the art. Any suitable modulator and valve may be used, such as the modulation valve disclosed in the aforesaid U.S. Pat. No. 4,318,509.

Downstream from the precooler 16, the temperature sensor 18 detects changes in the temperature of the supply fluid flowing within supply duct 12. The sensor 18 comprises a bimetallic element 32, such as that disclosed in the aforesaid U.S. Pat. No. 4,735,056. The element contacts the supply fluid within supply duct 12. A stem 34 of the element 32 protrudes out of the duct 12 and is affixed to an actuator assembly 36. The actuator assembly includes a bell crank 38 mounted at a pivot point 40 to a rigid mount 42. A crossbar end 44 of actuator assembly 36 straddles a top end 46 of the bell crank 38 and includes a pair of threaded, adjustable, telescoping sleeves 48,50 affixed one at each end of the crossbar. Axial rotation of a sleeve causes it to move axially along the crossbar 44, effectively lengthening or shortening the crossbar.

Two opposed, variable orifice ball valves 52, 54 or control poppets, are affixed within the sensor 18 adjacent the adjustable sleeves 48, 50. Each control poppet includes an orifice 56, 58; a ball 60, 62 adjacent the orifice, which is supported by a spring 64, 66; a housing 68, 70 that encloses the ball 60, 62, defining the orifice 56, 58; and pneumatic inlet 72, 74, affixed to the housing, 68, 70. Pneumatic inlet 72 is in fluid communication, via first servo duct 76, with the pneumatic controller 28 of the pressure regulating valve 20. Therefore, control poppet 52, which includes inlet 72, will hereinafter be identified as pressure regulating valve control poppet 52. Pneumatic inlet 74 is in fluid connection, via second servo duct 78, with pneumatic modulator 24 which controls the rate of flow of the cooling fluid through the precooler 16. Therefore, control poppet 54 will hereinafter be identified as precooler control poppet 54.

The temperature of the supply fluid is preferably maintained between an upper limit of approximately 450° F. and a lower limit of approximately 280° F. To achieve control within that range, prior to use, the temperature sensor 18 is calibrated in a temperature bath (not shown). The bath is regulated at a specific temperature, for example an upper limit of 450° F., and the bimetallic element 32 is exposed to the bath. That causes the actuator assembly to move. As shown in FIG. 1, the effective length of the crossbar 44 is then adjusted by axial rotation of threaded sleeve 48 so that contact between the threaded sleeve 48 and the ball 60 of the pressure regulator control poppet 52 allows the ball 60 to sit in and cover the orifice 56 of control poppet 52. The pressure regulating valve control poppet 52 is then referred to as "sealed". The opposed threaded sleeve 50 is then adjusted by axial rotation so that contact between it and the ball 62 of the precooler control poppet 54 causes the ball 62 to remain completely away from orifice 58, so that the maximum area of orifice 58 is uncovered. The precooler control poppet 54 is then referred to as "fully open" or "wide open".

The bath temperature is then set at a lower temperature limit, for example 280° F., and the threaded sleeves 48, 50 on the crossbar 44 are adjusted so that the pressure regulating valve control poppet 52 is wide open and the precooler control poppet 54 is sealed.

In operation, for purposes of explanation, it is assumed that the supply fluid is at a temperature within the desired temperature range. The temperature of the supply fluid leaving the compressor stages may increase in response to changes in atmospheric conditions or aircraft flight parameters. As the temperature approaches the pre-set upper limit of the range, the crossbar 44 of the actuator assembly 36 moves allowing the ball 60 of the pressure regulating valve control poppet 52 to move closer to the orifice, thereby decreasing the area of the orifice available for discharge of a first servo fluid out of the control poppet's housing 68. That increases the pressure of the first servo fluid, which increase in pressure is communicated through the pneumatic inlet 72, along the first servo duct 76 to the pneumatic controller 28 of the pressure regulating valve 20. In response to the increased pressure, the controller 28 communicates with the pressure regulating valve actuator 30 to adjust the supply fluid flow regulating valve 22 in duct 12 to restrict the rate of flow of the supply fluid.

Simultaneously, the crossbar 44 has caused the precooler control poppet 54 to be wide open, as described above. Therefore, a pressure decrease in a second servo fluid is communicated through pneumatic inlet 74 and second servo duct 78 to the pneumatic modulator 24. The modulator 24 in response to the decreased pressure of the second servo fluid, causes the cooling fluid flow regulating valve 26 in cooling duct 14 to open wide, minimizing restriction of cooling fluid flow in duct 14.

Therefore, the flow rate of supply fluid through the heat-exchange precooler 16 has been decreased to an absolute minimum by the restrictive action of the supply fluid flow regulating valve 22. At the same time, the flow rate of the cooling fluid through the precooler 16 has increased to a maximum, in response to the positioning of the cooling fluid regulating flow valve 26. Consequently, the temperature of the supply fluid leaving the precooler is thereby adjusted downward by the action of two separate valves 22, 26 responding to the single temperature sensor 18.

As the temperature of the supply fluid leaving the precooler 16 descends, the bimetallic element 32 changes its size, causing the actuator assembly 36 to alter the position of the two balls 60, 62 in their control poppets 52, 54. Ball 60 in the pressure regulating valve control poppet becomes unseated, thereby allowing flow of the first servo fluid to exit the orifice 56. The decrease in pressure is communicated to the pressure regulating valve 20 which in response, adjusts the supply fluid flow regulating valve 22 to decrease its restriction of supply fluid flow in duct 12. That increases the flow rate of supply fluid into the precooler 16. At the same time, ball 62 moves closer to its seat in the orifice 58 of precooler control poppet 54, causing a pressure increase in the second servo fluid. The pressure increase is communicated to the pneumatic modulator 24, which in response, adjusts the coolant fluid flow regulating valve to increase its restriction of coolant fluid flow in duct 14. That effectively decreases the flow rate of coolant fluid into the precooler 16.

Therefore, the temperature of the supply fluid flowing out of the precooler 16 has increased in response to the aforesaid drop in temperature. As the temperature of the supply fluid decreases, the same process continues so that the relative positions of balls 60, 62 change, thereby causing ongoing decrease in the restriction of supply fluid flow into the precooler 16 by supply fluid flow regulating valve 22 and a corresponding increase in the restriction of the cooling fluid flow by cooling fluid regulating valve 26.

As the temperature of the supply fluid reaches the lower limit of the desired temperature range, the actuator assembly adjusts the positions of balls 60, 62, and therefore the adjustments of the supply and coolant fluid flow regulating valves 22, 26 so that the flow rate of supply fluid into the precooler 16 is at an absolute maximum and the flow rate of coolant fluid into the precooler is at an absolute minimum. Accordingly, as can be seen, a single temperature sensor is disclosed that effectively activates two feedback temperature control loops to maintain a supply fluid within a specific temperature range, which temperature range can be altered by adjustments of the sensor.

It should be understood by those skilled in the art, that obvious structural modifications can be made without departing from the spirit of the invention. Accordingly, reference should be made primarily to the accompanying claims rather than the foregoing specification to determine the scope of the invention.

Having thus described the invention, what is claimed is:

1. A temperature control system for providing a supply fluid within a desired temperature range, which comprises:
   a. a supply duct that houses and directs the flow of the supply fluid;
   b. a cooling duct that houses and directs the flow of a cooling fluid;
   c. a precooler affixed to the fluid duct and cooling duct so that the supply fluid passes through the precooler in a heat-transfer relationship with the cooling fluid;
   d. a pressure regulating valve in fluid communication with the supply duct upstream of the precooler that controls the pressure and flow rate of the supply fluid within the supply duct;
   e. a modulator in fluid communication with the cooling duct upstream of the precooler that controls the flow rate of cooling fluid within the cooling duct;
   f. a temperature sensor for measuring and controlling the temperature of the supply fluid in the supply duct downstream from the precooler that comprises:
      i. a temperature sensing element affixed to the supply duct downstream from the precooler that moves an affixed stem in response to changes in the temperature of the supply fluid;
      ii. an actuator assembly having one end pivotally affixed to the stem of the temperature sensing element and a "T"-shaped crossbar end;
      iii. a pair of poppet valves adjacent the "T"-shaped crossbar end of the actuator assembly aligned so that one side of the crossbar end adjustably contacts a first poppet valve and the other side of the crossbar end adjustably contacts a second poppet valve;
      iv. a first servo duct in fluid communication with the first poppet valve and the pressure regulating valve so that a change in temperature of the supply fluid moves the stem of the temperature sensor that moves the actuator assembly which adjusts the first poppet valve thereby communicating through the first servo duct to the pressure regulating valve to change the pressure and flow of the supply fluid upstream of the precooler; and v. a second servo duct in fluid communication with a second poppet valve and the modulator so that a change in temperature of the supply fluid moves the stem of the temperature sensor that moves the actuator assembly which adjusts the second poppet valve thereby communicating through the second servo duct to the modulator to change the flow of the cooling fluid upstream of the precooler.

2. The temperature control system of claim 1 wherein the crossbar end of the actuator assembly includes a pair of opposed adjustable sleeves so that the sleeves may be adjusted to allow the first poppet valve to fully open and the second poppet valve to seal in response to a first specific temperature and to allow the first poppet valve to seal and the second poppet valve to fully open in response to a second specific temperature, thereby providing control of the supply fluid downstream of the precooler within a temperature range between the first and second specific temperatures.

3. The temperature control system of claim 2 wherein the temperature sensing element includes a bimetallic member that changes its length in response to changes in temperature of the supply fluid.

4. The temperature control system of claim 3 wherein the pressure regulating valve and modulator are pneumatically actuated by the poppet valves of the temperature sensor to control the flow of the supply and control fluids.

5. The temperature control system of claim 1 wherein the supply fluid comprises air bled from compressor stages of gas turbine engine.

6. In an aircraft supply fluid temperature control system characterized by a supply fluid flowing in a supply duct, said supply fluid being placed in a heat transfer relationship in a precooler with a coolant fluid flowing in a coolant duct, wherein the flow rate of the supply fluid is controlled by a pressure regulating valve upstream of the precooler and the flowrate of the coolant fluid is controlled by a modulator upstream of the precooler, the improvement comprising a temperature sensor for measuring and controlling the temperature of the supply fluid downstream from the precooler that includes a temperature sensing element affixed to the supply duct downstream from the precooler that moves an affixed stem in response to changes in the temperature of the supply fluid; an actuator assembly having one end pivotally affixed to the stem of the temperature sensing element and a "T"-shaped crossbar end; a pair of poppet valves adjacent the "T"-shaped crossbar end of the actuator assembly aligned so that one side of the crossbar end adjustably contacts a first poppet valve and the other side of the crossbar end adjustably contacts a second poppet valve; a first servo duct in fluid communication with the first poppet valve and the pressure regulating valve so that a change in temperature of the supply fluid moves the stem of the temperature sensor that moves the actuator assembly which adjusts the first poppet valve thereby communicating through the first servo duct to the pressure regulating valve to change the pressure and flow of the supply fluid upstream of the precooler; and a second servo duct in fluid communication with a second poppet valve and the modulator so that a change in temperature of the supply fluid moves the stem of the temperature sensor that moves the actuator assembly which adjusts the second poppet valve thereby communicating through the second servo duct to the modulator to change the flow of the cooling fluid upstream of the precooler.

7. The aircraft supply fluid temperature control system of claim 5 wherein the crossbar end of the actuator assembly includes a pair of opposed adjustable sleeves so that the sleeves may be adjusted to allow the first poppet valve to fully open and the second poppet valve to seal in response to a first specific temperature and to allow the first poppet valve to seal and the second poppet valve to fully open in response to a second specific temperature, thereby providing control of the supply fluid downstream of the precooler within a temperature range between the first and second specific temperatures.

8. The aircraft supply fluid temperature control system of claim 6 wherein the temperature sensing element includes a bimetallic member that changes in length in response to changes in temperature of the supply fluid.

9. The aircraft supply fluid temperature control system of claim 7 wherein the pressure regulating valve and modulator are pneumatically actuated by the poppet valves of the temperature sensor to control the flow of the supply and control fluids.

10. A temperature control system for providing a supply fluid bled from compressor stages of a gas turbine engine within a desired temperature range to service anti-ice, air conditioning and other aircraft subsystems, that comprises:

a. a supply duct that houses and directs the flow of the supply fluid;

b. a cooling duct that houses and directs the flow of a cooling fluid;

c. a precooler affixed to the fluid duct and cooling duct so that the supply fluid passes through the precooler in a heat-transfer-relationship with the cooling fluid;

d. a pressure regulating valve in fluid communication with the supply duct upstream of the precooler that controls the pressure and flow rate of the supply fluid within the supply duct;

e. a modulator in fluid communication with the cooling duct upstream of the precooler that controls the flow rate of cooling fluid within the cooling duct;

f. a temperature sensor for measuring and controlling the temperature of the supply fluid in the supply duct downstream from the precooler that comprises:

i. a temperature sensing element projecting into the supply duct that includes a bimetallic member which member changes its length in response to change in temperature of the supply fluid and which member includes an affixed stem;

ii. an actuator assembly having one end pivotally affixed to the stem of the temperature sensing element and a "T"-shaped crossbar end;

iii. a pair of poppet valves adjacent the "T"-shaped crossbar end of the actuator assembly aligned so that one side of the crossbar end adjustably contacts a first poppet valve and the other side of the crossbar end adjustably contacts a second poppet valve;

iv. a first servo duct in fluid communication with the first poppet valve and the pressure regulating valve so that a change in temperature of the supply fluid moves the stem of the temperature sensor that moves the actuator assembly which adjusts the first poppet valve thereby communicating through the first servo duct to the pressure regulating valve to change the pressure and flow of the supply fluid upstream of the precooler; and v. a second servo duct in fluid communication with a second poppet valve and the modulator so that a change in temperature of the supply fluid moves the stem of the temperature sensor that moves the actuator assembly which adjusts the second poppet valve thereby communicating through the second servo duct to the modulator to change the flow of the cooling fluid upstream of the precooler.

11. The temperature control system of claim 10 wherein the crossbar end of the actuator assembly includes a pair of opposed adjustable sleeves so that the sleeves may be adjusted to allow the first poppet valve to fully open and the second poppet valve to seal in response to a first specific temperature and to allow the first poppet valve to seal and the second poppet valve to fully open in response to a second specific temperature, thereby providing control of the supply fluid downstream of the precooler within a temperature range between the first and second specific temperatures.

12. The temperature control system of claim 11 wherein the pressure regulating valve and modulator are pneumatically actuated by the poppet valves to control the flow of the supply and coolant fluids.

13. A temperature control system for providing an operating or the supply fluid at a temperature within a desired temperature range, which comprises:

a. first inlet duct means for providing a supply fluid;
b. means for providing a cooling fluid at a temperature different from that of said supply fluid;
c. heat exchanger means for controlling the temperature of the supply fluid by passing the supply fluid in a heat transfer relationship with the cooling fluid thereby providing a cooled supply fluid;
d. temperature sensor means in fluid communication with the cooled supply fluid for maintaining the cooled supply fluid in the desired temperature range; and
e. said temperature sensor means comprising a single temperature sensor having two separate and independently set control poppet valve means for controlling the flow rates of the supply and cooling fluid being passed in heat exchange relationship.

14. A temperature control system for use in conjunction with a heat exchanger means for passing a first fluid from a first supply duct in heat exchange relationship therein with a second fluid from a second supply duct and for directing the first fluid through a first discharge duct at a temperature within a desired temperature range and the second fluid through a second discharge duct, comprising:

a. first valve means operatively disposed in the first supply duct for controlling the flow rate of the first fluid passing to the heat exchange means through the first supply duct;
b. second valve means operatively disposed in the second supply duct for controlling the flow rate of the second fluid passing to the heat exchange means through the second supply duct;
c. a single temperature sensor disposed in the first discharge duct in fluid communication with the first fluid passing therethrough for sensing the temperature of the first fluid passing therethrough;
d. control valve means having a first poppet valve means operatively associated with the first valve means for controlling the position of the first valve means within the first supply duct whereby the flow rate of the first fluid passing therethrough may be regulated, and a second poppet valve means operatively associated with the second valve means for controlling the position of the second valve means within the second supply duct whereby the flow rate of the second fluid passing therethrough may be regulated; and
f. mechanical linkage means operatively connected between said single temperature sensor and said control valve means for actuating said control valves means in response to said single temperature sensor whereby:

the flow rate of the first fluid through the first supply duct is decreased and the flow rate of the second fluid through the second supply duct is simultaneously increased whenever said single temperature sensor senses the temperature of the first fluid passing through the first discharge duct is increasing, and the flow rate of the first fluid through the first supply duct is increased and the flow rate of the second fluid through the second supply duct is simultaneously decreased whenever said single temperature sensor senses the temperature of the first fluid passing through the first discharge duct is decreasing.

15. A temperature control system as recited in claim 14 wherein said mechanical linkage means operatively connected between said single temperature sensor and said control valve means actuates said control valves means in response to said single temperature sensor whereby:

the flow rate of the first fluid through the first supply duct is decreased to a minimum flow rate and the flow rate of the second fluid through the second supply duct is simultaneously increased to a maximum flow rate whenever said single temperature sensor senses the temperature of the first fluid passing through the first discharge duct reaches a preselected maximum desired temperature, and the flow rate of the first fluid through the first supply duct is increased to a maximum flow rate and the flow rate of the second fluid through the second supply duct is simultaneously decreased to a minimum whenever said single temperature sensor senses that the temperature of the first fluid passing through the first discharge duct reaches a preselected minimum desired temperature.

* * * * *